2,712,020
HETEROCYCLIC ALLYLAMINES

Donald Wallace Adamson, London, England, assignor to Burroughs Wellcome & Co. (U. S. A.) Inc., Tuckahoe, N. Y., a corporation of New York No Drawing. Application September 10, 1951,
Serial No. 245,969

Claims priority, application Great Britain July 20, 1948

7 Claims. (Cl. 260—294.8)

The subject of the present invention is a family of powerful histamine antagonists having the general formula:

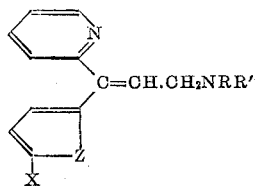

wherein X is selected from the class consisting of lower alkyl radicals, the halogens and hydrogen, Z is a bivalent radical selected fom the clss consisting of —CH=CH— and —S— and —NRR' is a secondary amino radical selected from the class consisting of the lower dialkylamino radicals, the piperidino and pyrrolidino radicals.

Compounds of this formula have been described in my co-pending application Ser. No. 105,257 of which this is a continuation-in-part. These substances are prepared by dehydration under acid conditions of the corresponding tertiary amino carbinols obtained by reacting an appropriate β-dialkylaminopropiophenone or propionthienone with 2-pyridyl lithium. These dehydrations have now been found to furnish mixtures of two geometrical isomers (differing in the cis or trans relationship of the —CH₂NRR' radical with the 2-pyridyl radical). These geometrical isomers can be separated by a variety of procedures to be described later and are found to be distinguishable by their ultraviolet absorption spectra. In each pair of isomers one has a strong absorption band at about 250 m$\mu$ when Z=—CH=CH— (actual range of $\gamma$ max.=247–257) thereby resembling the spectrum of styrene, whereas the other isomer has an intense absorption band at about 235 m$\mu$ and a somewhat weaker but still strong band at about 280 m$\mu$. This latter spectrum resembles closely that of 2 vinylpyridine whose absorption peaks are at 235 and 279 m$\mu$. In each case the isomer having the absorption at 235 and 280 m$\mu$ is 5–100 times as potent a histamine antagonist as that having the styrene-like absorption spectrum. In the cases where Z=—S—, the styrene-like absorption is replaced by a complex absorption between 270 and 300 m$\mu$ (presumably that of a thienyl ethylene) easily distinguishable from the spectra with bands at 235 and 280 shown by the physiologically active stereoisomers.

The probable explanation of this phenomenon is that in molecules of this type there is insufficient room for both the 2-pyridyl and the phenyl (or thienyl) radical to be co-planar with each other and with the double bond. The molecule is thus forced to assume a position with one ring tilted sharply as in:

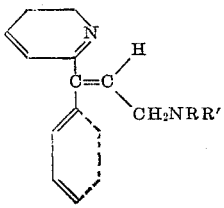

wherein the 2-pyridyl but not the phenyl ring is co-planar with the double bond and enters into resonance therewith. Resonance of the phenyl with the double bond is inhibited and the phenyl group affects the absorption of the system much like an aliphatic substituent. It is not demonstrated as yet whether the active isomers have the pyridyl radical cis or trans to the —CH₂NRR' group, and I characterize the active series of isomers by their absorption spectra rather than to make their description dependent on a speculative absolute structure.

The regularities of these absorption spectra are shown in the subjoined table for the compounds described in this application. These data are for solutions of the neutral oxalates dissolved in ethanol. Data for the p-methoxyphenyl compound of Example 11 are included though I do not desire to claim this substance, the methoxyl substitution having an unfavorable effect on the physiological activity. It will be seen, however, that the spectrum of the more active isomer is essentially identical with those of the other active isomers (which would hardly be the case if the methoxyl-bearing phenyl ring were involved in the resonance that results in the observed absorption of light). It will also be seen that the spectra of the active isomers of the thiophene derivatives Nos. 9 and 10 are essentially similar to those of Nos. 1–8. The inactive isomers, however, having spectra of a vinyl thiophene derivative absorb in a markedly different fashion from any of the active isomers or from the other inactive isomers.

In most dehydrations (as by thionyl chloride in benzene or by sulfuric acid at steam-bath temperatures) the active and inactive isomers are formed in comparable amount. The mixed isomeric bases can be separated from side-products etc. by conventional methods. Further separation of the isomers from each other can be accomplished by a number of methods not all of which are generally applicable. In the examples here disclosed Nos. 1, 3, 4, 5 and 6 and 8 were separated by fractional crystallization of the neutral oxalates, No. 7 by fractional crystallization of the bases, No. 7 by chromatography on an alumina column (with the bases) and Nos. 2, 9 and 10 by base exchange chromatography (on a column of an acidic resin). This last method is especially suited to work with the thiophene derivatives which are adversely affected by too drastic acidic conditions.

It has also been found that the inactive isomers are selectively destroyed by heating with acetic anhydride, thereby permitting ready isolation of the active isomers. This method is quite general and is illustrated in the isolation of the active isomer of No. 8. For most purposes these compounds are conveniently handled and administered as their salts, and, provided the acid used in forming the salt is not itself of high toxicity, the nature of the acid is immaterial (for physiological purposes). Consequently I consider all such salts to be equivalent to each other and to the corresponding bases.

Separation of the isomeric antihistamines by base exchange chromatography

A column of sulphonated cross-linked polystyrene of a low degree of crosslinkage (e. g., 2¼% nominal) and mesh size of the order of 250$\mu$ in the wet state, of dimensions such that the length is a large multiple (e. g., 30:1) of the diameter, is prepared by pouring a suspension of the resin in aqueous alcohol from which the dissolved air has been removed by short treatment in a vacuum. The proportions of alcohol and water are such as to maintain in solution about 20% of the mixed bases, the separation of which is desired. A quantity of the mixed bases, prepared in 20% solution as described, and such that it will exhaust about two-thirds of the resin, ascertained by prior experiment, is absorbed in the resin under a small head of pressure. The column is now washed with sufficient alcohol of the same aqueous concentration to remove all non-basic, including colored, material. The column is now irrigated with a solution of a base of significantly greater basic strength than the mixed bases it is sought to separate and of such a concentration that a relatively large volume of such a solution is needed to exhaust the column. The effluent from the column is collected during this irrigation in small fractions in a large number of tubes by automatic or other means. The contents of the tubes are examined by each of three or more methods. (1) By smell, when the characteristic odor of the displacing agent indicates its break through, (2) by quenching of the fluorescence of Whatman 1 filter paper in filtered ultra-violet light of wavelength 2537A by the presence of a portion of absorbing material removed from a tube, (3) by determination of the pH of the contents of the tube, or of a portion of the effluent of the column at the moment of entering such tube and (4) by a determination of the ultra-violet absorption spectra of suitably diluted portions of the contents of the tubes.

The results of such examination enables a decision to be taken which tubes contain the desired material separated into clear-cut fractions. A small portion of the total material may require to be discarded or reworked as described above, where the bands issuing from the column overlap. The same applies to the fractions immediately preceding the breakthrough of the displacing base, but this is best chosen on the grounds of its ease of separation from the desired bases.

EXAMPLE 1

1-(4-chlorophenyl)-1-(2-pyridyl)-3-pyrrolidinopropan-1-ol (20 g.) (prepared by the method of our co-pending application Ser. No. 105,257, and having M. P. 130–131°) is added with stirring to conc. sulphuric acid (100 cc.) and the mixture heated on the steam bath for ½ hour. The mixture is then cooled, poured on to crushed ice, basified by the addition of caustic soda liquor, and the liberated oil extracted with ether. The ether solution is clarified by filtration, and the ether removed by distillation. The residual pale-brown oil consists of a mixture of the active and inactive geometrical isomers of 1-(4-chlorophenyl)-1-(2-pyridyl)-3-pyrrolidinoprop-1-ene. These are separated by fractional crystallization of their neutral oxalates. The mixture of isomers (18 g.) is dissolved in ethanol (50 cc.) and one equivalent (7.6 g.) of oxalic acid dihydrate dissolved in a few cc. of ethanol is added. The mixture of oxalates of the isomers crystallizes rapidly and is filtered off, washed with a little ethanol and dried, and then has a melting range ca. 148–155° (decomp.).

After numerous recrystallizations from alcohol the less soluble oxalate, that of the active isomer, is obtained as colorless, hair-like needles, having M. P. 184° (decomp.). Light absorption in ethanol: maxima, $\lambda=235$, $280 m\mu$; $\epsilon=21,300$, $9,600$. The filtrates from the earlier crystallizations are concentrated, when the more soluble oxalate of the pair, that of the inactive isomer, separates as colorless plates, and is filtered off, washed and dried. To free it completely from traces of active isomer, it is recrystallized from chloroform, when it separates as needle prisms containing one molecule of chloroform of crystallization. This may be removed by drying at 100° or by recrystallization from ethanol. The pure inactive isomer oxalate so obtained has M. P. 156–157° (decomp.). Light absorption in ethanol: maximum, $\lambda=255$ m$\mu$; $\epsilon=22,400$.

From the separated isomer oxalates the pure isomer bases may be obtained by known methods. The active isomer base is solid, and after crystallization from light petroleum forms prisms, M. P. 61°. The inactive isomer base is an oil. The active isomer may be freed of contamination with a small proportion of inactive isomer base by crystallization from light petroleum.

Alternatively, the active isomer may be obtained free of the inactive by the preferential destruction of the latter with boiling acetic anhydride.

The mixed isomer bases (10 g.) are dissolved in acetic anhydride (50 cc.) and boiled under reflux for ½ hour. The excess acetic anhydride is removed by distillation under reduced pressure. The brown oily residue rapidly deposits crystalline material which is removed by filtration and discarded. The filtrate is dissolved in ether, washed with excess dilute aqueous ammonia, and the ether removed by distillation. The residual oil is converted to oxalate by the method outlined above and after one recrystallization from ethanol pure active isomer oxalate, M. P. 184° (decomp.), is obtained.

Alternatively, the isomer may be separated by chromatography on an alumina column, as described in Example 7.

EXAMPLE 2

1 - phenyl - 1 - (2 - pyridyl) - 3 - pryrrolidinopropan-1-ol (20 g.) (prepared by the method of our co-pending application Ser. No. 105,257 and having M. P. 93–94°) is dissolved with stirring in 85% sulfuric acid (100 cc.) and heated on the steam bath for 10 minutes. After working up by the method of Example 1 there is obtained a mixture of the active and inactive isomers of 1 - phenyl - 1 - (2 - pyridyl) - 3 - pyrrolidinoprop - 1-ene as a brown oil. By the method of Example 1 there is obtained a mixture of oxalates, colorless plates, having melting range 145–152° (decomp.). These oxalates are only separable by fractional crystallization with great difficulty.

The isomers may be separated by base exchange chromatography. The mixed base (3 g.) in 40% aqueous ethanol (30 cc.) were put on a column of sulfonated cross-linked polystyrene [of a low degree of cross-linkage, e. g. 2¼% nominal, and mesh size of the order of 250$\mu$ in the wet state] of dimensions 25 x 1.3 cm. The column was washed with 40% aqueous ethanol (250 cc.) and the bases then displaced by 0.1 M $NH_4+$ in 40% aqueous ethanol. The effluent was collected in 60 fractions of 4.4 cc. each before the $NH_4+$ front appeared. Using the criterion of light absorption of 1:100 dilutions of the fractions, it was found that tubes 15–25 contained material absorbing maximally at 240 and 280 m$\mu$ and tubes 30–43 at 250 m$\mu$ only. The contents of tubes 26–29 showed overlap of these peak absorptions and these tubes 44–60 were discarded. The bases separated in this way were converted to oxalates and recrystallized. The active isomer oxalate has M. P. 164–165° (decomp.) Light absorption in ethanol: maxima, $\lambda=236.5$, $281.5$ m$\mu$; $\epsilon=15,000$, $8,000$. The inactive isomer oxalate has M. P. 169–170° (decomp.). Light absorption in ethanol: maxima, $\lambda=235$, $251$ m$\mu$; $\epsilon=12,200$, $12,200$.

Alternatively, the active isomer may be obtained free of the inactive by treatment with acetic anhydride by the method given in Example 1. The mixed isomer bases (30 g.) are dissolved in acetic anhydride (150 cc.) and boiled under reflux for 15 minutes. After working up as described in Example 1 there is obtained a brown oil (26 g.) from which by treatment with oxalic acid there is obtained pure active isomer oxalate.

EXAMPLE 3

3 - dimethylamino - 1 - phenyl - 1 - (2 - pyridyl) propan-1-ol (20 g.) (prepared by the method of co-pending application Ser. No. 105,257, and having M. P. 99–100°) is dissolved in 90% sulfuric acid (100 cc.) and heated on the steam bath for ½ hour. After working up by the method of Example 1 there is obtained a mixture of oxalates of the active and inactive isomers of 3 - dimethylamino - 1 - phenyl - 1 - (2 - pyridyl)-prop-1-ene, having melting range 165°–170° (decomp.). These are separated by fractional crystallization from ethanol to give the more soluble active isomer oxalate, M. P. 178–179° (decomp.), light absorption in ethanol: maxima, $\lambda=237.5$, 280 m$\mu$; $\epsilon=16,800$, 9,000; and the less soluble inactive isomer oxalate, M. P. 180–181° (decomp.), light absorption in ethanol: maximum, $\lambda=247$ m$\mu$; $\epsilon=15,200$.

Alternatively the active isomer may be freed from the inactive isomer by the degradation of the latter with boiling acetic anhydride by the method given under Example 1.

EXAMPLE 4

1 - phenyl - 3 - piperidino - 1 - (2 - pyridyl)propan-1-ol (20 g.) (prepared by the method of our co-pending application Ser. No. 105,257 and having M. P. 84–85°) is dissolved in 85% sulfuric acid (100 cc.) and heated on the steam bath for ½ hour. After working up by the method of Example 1 there is obtained a mixture of oxalates of the active and inactive isomers of 1-phenyl-3 - piperidino - 1 - (2-pyridyl)prop - 1 - ene which may be separated by fractional crystallization from ethanol into the less soluble active isomer, M. P. 173–174° (decomp.) (light absorption in ethanol: maxima, $\lambda=273.5$, 280.5 m$\mu$; $\epsilon=14,400$, 6,600) and the more soluble inactive isomer, M. P. 175–176° (decomp.) (maximum: $\lambda=253$ m$\mu$; $\epsilon=20,000$).

Alternatively, the active isomer may be freed from the inactive isomer by boiling with acetic anhydride by the method given in Example 1.

EXAMPLE 5

1 - (4 - chlorophenyl) - 3 - dimethylamino - 1 - (2-pyridyl)propan-1-ol (20 g.) (prepared by the method of our co-pending application Ser. No. 105,257, and having M. P. 89–90°) is dissolved in conc. sulfuric acid (100 cc.) and heated for ½ hour on the steam-bath. After working up by the method of Example 1 there is obtained a mixture of oxalates of the active and inactive isomers of 1-(4-chlorophenyl)-3-dimethylamino-1-(2′-pyridyl)prop-1-ene. These may be separated by the following crystallization procedure. A cold saturated alcoholic solution of the mixed oxalates is evaporated to one half its volume and allowed to cool. While still slightly above room temperature a crop of plate crystals separates. These are immediately filtered off, and shortly from the filtrate a crop of fine hair-like needles separates, and is filtered off. The needles are recrystallized to give pure active isomer oxalate, M. P. 182–183° (decomp.) (light absorption in ethanol: maxima, $\lambda=228$, 280 m$\mu$; $\epsilon=20,200$, 8,700). The plates are recrystallized to give pure inactive isomer oxalate, M. P. 174–175° (decomp.) (light absorption in ethanol: maximum, $\lambda=255$ m$\mu$; $\epsilon=21,100$).

Alternatively the pure active isomer oxalate may be obtained by the acetic anhydride procedure described in Example 1.

The active and inactive isomer bases may be obtained from the oxalates by known methods. The active isomer base is an oil. The inactive isomer base is a solid, M. P. 61° after crystallization from light petroleum, and may be separated in this way from small proportions of the active isomer.

EXAMPLE 6

1-(4-chlorophenyl)-3-piperidino-1-(2-pyridyl)-propan-1-ol (20 g.) (prepared by the method of co-pending application Ser. No. 105,257, and having M. P. 97–98°) is dissolved in conc. sulfuric acid (100 cc.) and heated on the steam bath for ½ hour. After working up by the method of Example 1 there is obtained a mixture of the oxalates of the active and inactive isomers of 1-(4-chlorophenyl)-3-piperidino-1-(2-pyridyl)-prop-1-ene, which may be separated by fractional crystallization from ethanol to give the active isomer oxalate, rosettes of long plates, M. P. 173–174° (decomp.) (light absorption in ethanol; maxima, $\lambda=235$, 280 m$\mu$; $\epsilon=18,200$, 8,200), and the inactive isomer oxalate, prisms, M. P. 175–176° (decomp.) (light absorption in ethanol; maximum, $\lambda=257$ m$\mu$; $\epsilon=21,200$).

Alternatively, the active isomer oxalate may be obtained by the acetic anhydride degradation by the method given in Example 1.

EXAMPLE 7

1-chlorobutane (74 g.) in anhydrous ether (200 cc.) was added dropwise, with stirring, to freshly sliced lithium (14 g.) mixed with a few glass beads, at such a rate as to maintain gentle reflux. After stirring and boiling under reflux for a further one hour, excess of lithium was removed by pouring the mixture through glass wool. The filtrate was cooled to —45° C., a solution of 2-bromopyridine (103 g.) in anhydrous ether (100 cc.) added during 20 minutes and stirring continued for a further 8 minutes. p-Bromo-$\beta$-pyrrolidinopropiophenone (57 g.) in anhydrous benzene (100 cc.) was added during 20 minutes and the reaction mixture then stirred at —15° C., for one hour. The reaction was carried out in an atmosphere of dry nitrogen up to this stage.

The reaction mixture was poured on crushed ice (200 g.) and glacial acetic acid added until the solution was acid to litmus. The aqueous layer was separated, washed with ether, excess ammonia added, and the base extracted with chloroform. After washing with water and drying over anhydrous magnesium sulfate, the extract was evaporated and the residual brown gum extracted with boiling light petroleum (boiling point 60–80° C.) The petroleum extract was evaporated and the residual solid crystallized from ethanol to give 1-(4-bromophenyl)-1-(2-pyridyl)-3-pyrrolidinopropan-1-ol, melting point 144–145° C.

The carbinol (10 g.) is dissolved in 85% aqueous sulfuric acid (20 cc.) and heated at 180° for 10 minutes. On working up as described in earlier examples, the mixture of isomeric 1-(4-bromophenyl)-1-(2-pyridyl)-3-pyrrolidinoprop-1-enes (9.1 g.) is obtained as a pasty mass. Crystallization from light petroleum (B. P. 60–80°) gives a solid, M. P. 84–87° (3.9 g.) which, on further crystallization, gives the pure (active) isomer base, M. P. 89–90°. Light absorption in ethanol: maxima, $\lambda=238$, 280 m$\mu$; $\epsilon=18,300$, 7,200. Oxalate, M. P. 178–180° (decomp.).

The base recovered from the mother liquors of the original crystallization yields an oxalate, M. P. 135–150° (decomp.), which after repeated recrystallization from a mixture of methanol and ethanol gives the pure (inactive) isomer oxalate, M. P. 164–165° (decomp.). Light absorption in ethanol: maximum, $\lambda=257$ m$\mu$; $\epsilon=24,800$.

Alternatively, the mixture of isomeric bases obtained by dehydration of the carbinol (10 g. heated for 5 minutes with 85% aqueous sulfuric acid; 30 cc.) is separated by chromatography on an alumina column.

The crude base is extracted with light petroleum (B. P. 40–60°; 150 cc.), the extract evaporated to 50 cc. and poured on to a column of alumina (23 x 3 cm.). A dark band forms at the top while a broad yellow band travels down the column on elution with more light petroleum.

It is necessary progressively to dilute the solvent with chloroform (maximum chloroform content, 25%) in order to elute the whole of the material.

The initial eluate fractions are evaporated and the syrupy residues bulked and converted into the oxalate, which on repeated crystallization from ethanol gives the pure inactive isomer oxalate. The final fractions of eluate are evaporated and the pasty solid residues bulked and crystallized twice from light petroleum (B. P. 60–80°) to give the pure active isomer base.

EXAMPLE 8

1 - (4-chlorophenyl)-3-ethylmethylamino-1-(2-pyridyl) propan-1-ol (20 g., M. P. 46–47°) (prepared by the method of our co-pending application Ser. No. 105,257)

is heated at 170° for 10 minutes with 85% aqueous sulfuric acid (40 cc.). The mixture (17.3 g.) of isomeric 1 - (4 - chlorophenyl)-3-ethylmethylamino-1-(2-pyridyl) prop-1-enes obtained on working up in the usual manner is boiled under reflux with acetic anhydride (150 cc.) for 10 minutes. The residual acetic anhydride is removed by evaporation under reduced pressure, and the residue shaken with ether and dilute aqueous ammonia. The ether solution is extracted with dilute hydrochloric acid. Excess ammonia is added to the acid extract and the precipitated oil extracted with ether. The ether extract is dried over sodium sulfate, the ether evaporated and the residual syrup fractionally distilled under reduced pressure. The product (active isomer base) has B. P. 134–136°/0.02 mm., $n_D^{19}$=1.5959. Light absorption in ethanol: maxima, $\lambda$=235, 280 m$\mu$; $\epsilon$=17,600, 7,200. Oxalate, crystallized from ethanol, M. P. 161–162° (decomp.).

The inactive isomer oxalate (M. P. 156.5–157.5° (decomp.); light absorption in ethanol; maximum, $\lambda$=257 m$\mu$; $\epsilon$=19,300) is obtained by fractional crystallization of the mixture of oxalates prepared in the usual manner from the dehydration product.

EXAMPLE 9

5-chloro-2-thienyl-$\beta$-pyrrolidino ethyl ketone, when reacted with 2-pyridyl lithium by essentially the same method as that described in Example 7, gave 1-(5-chloro-2-thienyl)-1-(2-pyridyl-3-pyrrolidinopropan-1-ol, melting point 89–91° C.

This carbinol (10 g.) is heated at 105° for 10 minutes with 65% aqueous sulfuric acid (40 ml.) and the product, a mixture of isomeric 1-(5-chloro-2-thienyl)-1-(2-pyridyl)-3-pyrrolidinoprop-1-ene bases, isolated as a red oil by the usual methods. The isomeric bases are separated by base exchange chromatography. The mixed bases (8.9 g.) in 60% aqueous ethanol (43 ml.) are adsorbed on a column of sulfonated cross-linked polystyrene (of a low degree of cross-linkage, e. g. 2¼% nominal and mesh size of the order of 250$\mu$ in the wet state) of dimensions 34 x 1.2 cm. The column is washed with 60% ethanol and the bases displaced by 0.2 M NH$_4$+ in 60% ethanol. Tubes 30–40 and 50–80, of 4.4 ml. each, give spectra, judged by the ratio of light absorption at 240 m$\mu$ to that at 270 m$\mu$, indicating that separation of the two isomers has been effected. The base from the earlier fractions is treated with oxalic acid to give, after recrystallization from methanol, the pure active isomer oxalate, M. P. 148–149° (decomp.). Light absorption in ethanol, maxima, $\lambda$=240, 278 m$\mu$; $\epsilon$=15,000, 11,000. The base from the later fractions affords the pure inactive isomer oxalate, M. P. 149–150° (decomp.). Light absorption in ethanol: shelf at $\lambda$=245 m$\mu$; $\epsilon$=7,600, and a broad peak with fine structure between $\lambda$=270 m$\mu$ and $\epsilon$=300 m$\mu$, average $\epsilon$=10,200.

EXAMPLE 10

1-(2-pyridyl) - 3 - pyrrolidino-1-(2-thienyl)propan-1-ol (10 g.) (prepared by the method of our co-pending application Ser. No. 105,257, and having M. P. 71–72°) is heated on the steam-bath for 10 minutes with 65% aqueous sulfuric acid (40 ml.) and the resulting mixture of isomeric 1-(2-pyridyl) - 3 - pyrrolidino - 1 - (2-thienyl)-prop-1-enes (8.8 g.) separated by base exchange chromatography. The initial basic fractions give the pure active isomer oxalate. Recrystallized from methanol, M. P. 156–157° (decomp.). Light absorption in ethanol: maxima, $\lambda$=240, 276 m$\mu$; $\epsilon$=14,900, 10,000.

EXAMPLE 11

1 - (4-methoxyphenyl)-1-(2-pyridyl)-3-pyrrolidinopropan-1-ol (10 g.) (prepared by the method of our co-pending application Ser. No. 105,257, and having M. P. 82–83°) is heated at 120° for 10 minutes with 65% aqueous sulfuric acid (40 cc.). The resulting mixture of isomeric 1-(4-methoxyphenyl)-1-(2-pyridyl)-3-pyrrolidino-prop-1-ene bases is separated by base exchange chromatography. The initial basic fractions give the pure active isomer oxalate. Recrystallized from methanol, M. P. 180–181° (decomp.). Light absorption in ethanol; maxima, $\lambda$=235, 277 m$\mu$; $\epsilon$=18,200, 11,200.

EXAMPLE 12

1-(4-methylphenyl) - 1 - (2-pyridyl)-3-pyrrolidino-propane-1-ol (10.0 g.; M. P. 118–119° C.) was heated at 175° C. for 10 minutes with aqueous sulfuric acid (85%; 20 cc.). The basic product, obtained by working up as described in earlier examples, was a sticky solid (8.3 g.). Conversion to the oxalate and recrystallization of this from methanol gave the pure oxalate of the active isomer of 1 - (4-methylphenyl)-1-(2-pyridyl)-3-pyrrolidinoprop-1-ene, M. P. 172–173° C. (decomp.). Light absorption in ethanol: maxima, $\lambda$=233 m$\mu$ and 283 m$\mu$; $\epsilon$=16,200 and 8,200.

| Ex.# | X | Z | —NRR' | Active Isomer | | Inactive Isomer | |
|---|---|---|---|---|---|---|---|
| | | | | $\lambda$ max. m$\mu$ | $\epsilon$ | $\lambda$ max. m$\mu$ | $\epsilon$ |
| 1 | Cl | —CH=CH— | —N(CH$_2$)$_4$ | 235 / 280 | 21,300 / 9,600 | 255 | 22,400 |
| 2 | H | —CH=CH— | —N(CH$_2$)$_4$ | 236.5 / 281.5 | 15,000 / 8,000 | 235 / 251 | 12,200 / 12,200 |
| 3 | H | —CH=CH— | —NMe$_2$ | 237.5 / 280 | 16,800 / 9,000 | 247 | 15,200 |
| 4 | H | —CH=CH— | —N(CH$_2$)$_5$ | 237.5 / 280.5 | 14,400 / 6,600 | 253 | 20,000 |
| 5 | Cl | —CH=CH— | —NMe$_2$ | 228 / 280 | 20,200 / 8,700 | 255 | 21,100 |
| 6 | Cl | —CH=CH— | —N(CH$_2$)$_5$ | 235 / 280 | 18,200 / 8,200 | 257 | 21,200 |
| 7 | Br | —CH=CH— | —N(CH$_2$)$_4$ | 238 / 280 | 18,300 / 7,200 | 257 | 24,800 |
| 8 | Cl | —CH=CH— | —NMeEt | 235 / 280 | 17,600 / 7,200 | 257 | 19,300 |
| 11 | MeO | —CH=CH— | —N(CH$_2$)$_4$ | 235 / 277 | 18,200 / 11,200 | (1) | (1) |
| 9 | Cl | —S— | —N(CH$_2$)$_4$ | 240 / 278 | 15,000 / 11,000 | (1) | (1) |
| 10 | H | —S— | —N(CH$_2$)$_4$ | 240 / 276 | 14,900 / 10,000 | (1) | (1) |
| 12 | CH$_3$ | CH=CH | —N(CH$_2$)$_4$ | 233 / 283 | 16,200 / 8,200 | (1) | (1) |

[1] Complex absorption with several peaks in the range 270–300 m$\mu$.

I claim:
1. As a new compound, a substance having the formula:

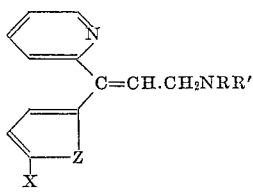

wherein X is selected from the class consisting of the halogens and hydrogen, Z is a bivalent radical of the class consisting of —S— and —CH=CH—, and —NRR' is a secondary amino radical selected from the class consisting of the lower dialkylamino radicals, the piperidino and the pyrrolidino radicals and R and R' together contain not over five carbon atoms, and whose salts in alcoholic solution show absorption maxima in the ranges 235–240 m$\mu$ and 275–282 m$\mu$.

2. As a new compound, a substance having the formula:

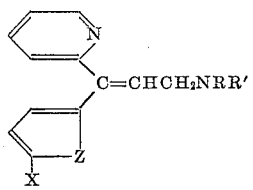

wherein X is selected from the class consisting of the halogens and hydrogens, Z is a bivalent radical of the class consisting of —S— and —CH=CH—, and —NRR' is a secondary amino radical selected from the class consisting of the lower dialkylamino radicals, the piperidino and the pyrrolidino radicals and R and R' together contain not over five carbon atoms.

3. As a new compound, a substance having the formula:

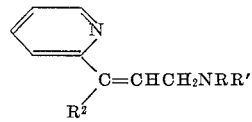

wherein $R^2$ is a phenyl radical and —NRR' is a secondary amino radical selected from the class consisting of the lower dialkylamino radicals, the piperidino and the pyrrolidino radicals and R and R' together contain not over five carbon atoms.

4. 1-(2'-pyridyl) - 1 - p - chlorophenyl -3- pyrrolidino-prop-1-ene, whose salts in alcohol show maximal absorption at about 235 and 280 m$\mu$.

5. 1-(2'-pyridyl)-1-p-bromophenyl-3-pyrrolidino-prop-1-ene, whose salts in alcohol show maximal absorption at about 238 and 280 m$\mu$.

6. 1-phenyl-1-(2'-pyridyl) - 3 - pyrrolidino prop-1-ene whose salts in alcohol show maximal absorption at about 236 and 281 m$\mu$.

7. 1-(2'-pyridyl)-1-(5''-chloro-2''-thienyl) -3- pyrrolidino prop-1-ene whose salts in alcohol show maximal absorption at about 240 and 278 m$\mu$.

References Cited in the file of this patent
UNITED STATES PATENTS 2,502,151  Horclois _____ Mar. 28, 1950

FOREIGN PATENTS 883,539  France _____ Mar. 29, 1943